Nov. 2, 1971  E. VOGELI  3,616,787
OVERFLOW VALVE FOR A STEAM PLANT
Filed Jan. 2, 1970  2 Sheets-Sheet 1

Inventor:
ERNST VOGELI
BY
Kenyon & Kenyon Reilly Carr & Chapin
ATTORNEYS

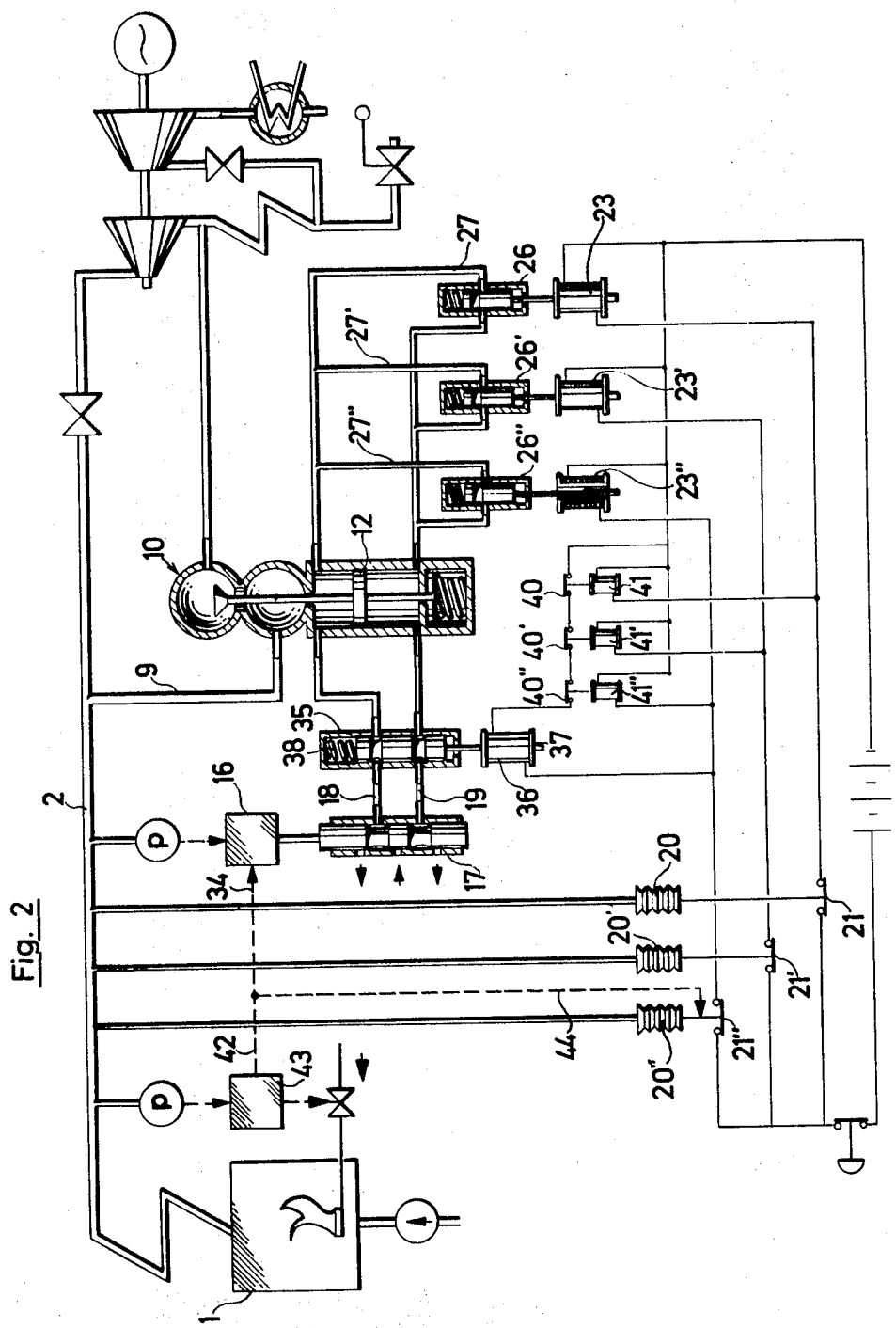

United States Patent Office 3,616,787
Patented Nov. 2, 1971

3,616,787
OVERFLOW VALVE FOR A STEAM PLANT
Ernst Vogeli, Wiesendangen, Zurich, Switzerland, assignor to Sulzer Brothers, Ltd., Winterthur, Switzerland
Filed Jan. 2, 1970, Ser. No. 310
Int. Cl. F22d 7/12
U.S. Cl. 122—406 R          10 Claims

ABSTRACT OF THE DISCLOSURE

The overflow valve is combined with a servo-piston which opens and closes the valve. The servo-piston is actuated by the opening of a valve in a bridging circuit of the servo-piston which thus allows a flow of oil from one side of the servo-piston to the other via a pair of oil conduits.

---

Figure 1:
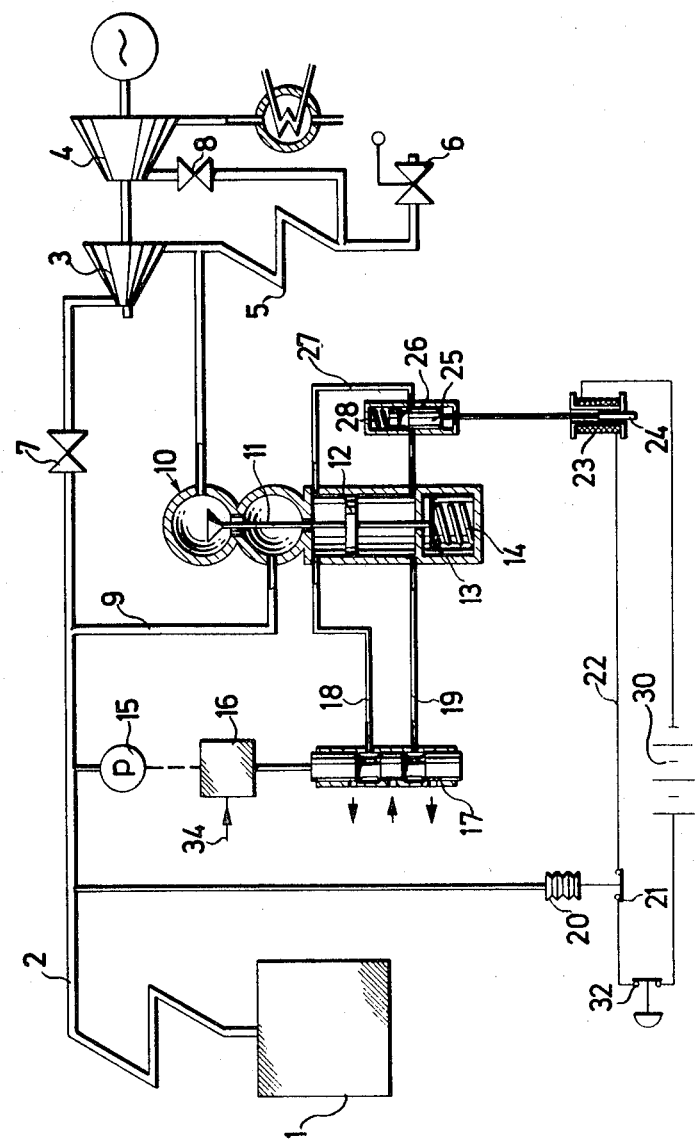

The invention relates to an overflow valve for a steam plant, and more particularly, to an overflow valve between a steam generator and a consumer.

Steam plants have been known in which overflow valves have been disposed in a conduit branched off between a steam generator and consumer and in which a double-acting servo-piston has been provided as a drive for the spindle of the overflow valve with the drive being dependent on the operative medium coming from the steam generator.

In such steam power plants having forced-feed steam generators, attempts have been made to transfer the function of the safety valve, prescribed at an earlier date by law, to the overflow valve, for the purpose of avoiding installing a separate safety valve. However, such has generally involved complex constructions as well as relatively large costs.

Accordingly, it is an object of the invention to provide an overflow valve which is able to assume a safety function.

It is another object of the invention to provide an overflow valve of low-cost constructional and circuit-arrangement expense.

Briefly, the invention provides a steam generator and a consumer with a branch conduit in which an overflow valve is positioned with a servo-piston for driving the spindle of the overflow valve in response to the pressure of the operating medium of the plant. The servo-piston is provided with at least one conduit which bridges the servo-piston as well as with a valve in the conduit. This valve is actuated to open when the pressure of the operative medium, e.g. steam, at the inlet of the overflow valve exceeds a safety limiting valve.

Thus, the bridging conduit and valve serve in a simple and reliable way to obtain an opening of the overflow valve when, as a result of the occurrence of a supplementary storing, the live-steam pressure rises close to the concession or design pressure of the steam plant.

These and other objects and advantages of the invention will become more apparent from the following detailed description and appended claims taken in conjunction with the accompanying drawings in which:

FIG. 1 schematically illustrates a steam power plant with an overflow valve according to the invention; and FIG. 2 schematically illustrates a modification according to the invention.

Referring to FIG. 1, a steam power plant has a steam generator 1 which is connected by a live-steam conduit 2 with a turbine installation which consists of a high-pressure turbine 3 and a low-pressure turbine 4. An intermediate superheater 5 is interposed between the two turbines 3, 4 and is connected with a conventional safety-valve 6. The inlets into the two turbines 3, 4 are provided in the usual way with regulatory valves 7, 8 respectively, which are, for example, influenced by the turbine rotary speed.

In addition, an overflow conduit 9 branches from the live-steam conduit 2 and has an overflow valve 10 disposed therein. The overflow valve 10 also has an outlet line 50 which is connected into the line between the high pressure turbine 3 and the intermediate superheater 5. In order to drive the valve spindle 11 of the overflow valve 10, a double-acting servo-piston 12 is provided. The piston 12 is slidably disposed within a cylinder which is connected to the housing of the valve 10 to form, for example, an integrated unit. The servo-piston rod is of the same diameter on both sides of the piston 12 so that the cross sections of the spaces at both sides of the piston 12 are equivalent. As shown, the piston rod is extended downward, and is provided with a plate 13 at the lower end against which a pressure-spring 14 bears. The spring 14 is suitably housed in an extension of the servo-cylinder.

Further, a pressure sensor 15 is provided in the live-steam conduit 2 upstream of the branching of the overflow conduit 9 as viewed in the line-steam flow direction. The pressure sensor 15 acts through the intermediary of a regulator 16, of I character for example, on a hydraulic control slide 17. The control slide 17 is connected by way of a pressure-oil conduit 18 with the space above the servo-piston 12, and by way of a pressure conduit 19 with the space below the servo-piston 12.

In addition to the pressure-sensor 15, a pressure-sensor 20 is connected to the live-steam conduit 2, e.g. up-stream of the pressure sensor 15. This pressure sensor 20, through the intermediary of a switch 21, influences a magnet coil 23 disposed in an electric circuit 22. The iron core 24 of the magnet coil 23 is connected with a slide 25 of a valve 26, which is disposed in a conduit 27 bridging over the servo-piston 12. That is, the conduit connects at one end with the space within the cylinder to one side of the piston 12 and at the other end with the space within the cylinder to the opposite side of the piston 12. The cross section of the bridge-over conduit 27 is greater than the cross section of the pressure-oil conduit 18 or 19. With the electrical circuit 22 closed, the magnet coil 23 is energized, and the iron core 24 is attracted and presses the slide 25 upward against a spring 28 housed in the housing of the valve 26. This causes the connection of the spaces on both sides of the servo-piston 12, over the bridge-over conduit, to be interrupted.

In order to operate the valve 26 independently of the pressure-sensor 20, a manually operated switch 32 is provided in the electrical circuit 22, equipped with a battery 30.

As shown, the overflow valve 10 is in a partly open position, while the control slide 17 is in a neutral position. This position corresponds, for example, to a starting-up state of the steam power plant, whereby the valves 7, 8 are closed. Thus, the operative medium flowing through the live-steam conduit 2 arrives, by way of the conduit 9 and the overflow valve 10, in the intermediate superheater 5, and emerges by way of the safety valve 6.

In normal operation of the plant the overflow valve 10 is closed and becomes influenced by the regulator 16. If the pressure of the live steam rises above the desired value, whose entry into the regulator 16 is indicated by the arrow 34, then through the intermediary of the control slide 17 a supply of pressure-oil is introduced to the conduit 19 and a discharge of oil is permitted out of the conduit 18. The servo-piston 12 is thus moved upward, so that the overflow valve opens. If the desired pressure is not achieved, then pressure-oil is supplied to the other side of the servo-piston 12 through the conduit 18 and the valve 10 closes. By means of the pressure-sensor 20 and the valve 26 with the bridge-over conduit 27, the overflow valve 10 also assumes the function of a safety valve.

For operation, the pressure-sensor 20 is adjusted to the concession pressure (i.e., the permissible pressure for the plant) of the steam generator 1. When the pressure of the steam in the live-steam conduit 2 reaches this concession pressure, then the switch 21 becomes opened, and the electric circuit 22 is interrupted. The magnet coil 23 becomes currentless and the iron core 24 drops off, so that the slide 25, under the influence of the spring 28, becomes pushed downward, thereby opening the valve 26. The servo-piston 12 thereby becomes relieved of the pressure-oil load, and the overflow valve 10 opens under the influence of the steam pressure exerted in the live-steam conduit 2. The pressure-spring 14 reinforces this opening movement by biasing the piston 12 to open the valve 10, and helps to overcome the friction between the valve spindle 11 and the valve housing.

Referring to FIG. 2, wherein like reference characters refer to like parts above, instead of a single pressure-sensor 20, three pressure-sensors 20, 20', 20", each operating one of three switches 21, 21' or 21", respectively are provided. In accordance with this, three magnet coils 23, 23' and 23", each acting on a valve 26, 26' or 26", respectively, are disposed in a bridge-over conduit 27, 27' or 27", respectively. By means of this arrangement, the reliability of the equipment is increased, since an opening of one of the three valves 26 to 26" is guaranteed even if one or two of the pressure-sensors 20 to 20" are defective.

Additionally, a blocking element 35, which is subjected to the influence of pressure of the pressure-oil supplied to the control slide 17, is provided in the conduits 18, 19. This influence is however not represented in FIG. 2. The blocking element 35 has the function in the event of a failure of the pressure-oil, of interrupting the connection of the control slide 17 with the servo-piston 12, so that the piston 12 is blocked against further movement and retains the position it just occupied.

In a further development, the blocking element 35 is subjected in only a supplementary way to the influence of the three pressure-sensors 20 to 20". For this purpose, a magnet coil 36 is provided whose iron core 37 is connected with the slide of the blocking slide while the element 35 bears at the upper end, as shown, against a spring 38. Also three relay-contacts 40, 40' and 40" are installed in the circuit of the coil 36 in series whose coils 41, 41', 41" are connected, each in parallel, with one of the magnet coils 23 to 23". If upon reaching the concession pressure, one of the switches 21 to 21" becomes opened, the corresponding magnet coils 23 to 23" become currentless and the associated valves 26 to 26" become opened. There then become opened, at the same time, the corresponding relays 41 to 41", and the magnet coil 36 also becomes currentless, so that the blocking element 35 interrupts the connection of the servo-piston 12 with the control slide 17.

If the steam-power plant is to be operated with a sliding pressure, that is, if the pressure in the live-steam conduit decreases as the load decreases, then it is advantageous for the desired value of the regulator 16 to be adjusted. For example, as indicated in FIG. 2 by the dotted line 42, which represents a signal conduit of a firing regulator 43, the firing is adjusted in dependence on the load on the steam generator 1. In the case of sliding-pressure operation, as the desired value 34 is adjusted, the response setting of one of the pressure-sensors 20 to 20" is adjusted simultaneously. For example, the length of the rod between the 20, 20', 20" and its associated switch is altered. This adjusting possibility is indicated by the dotted line 44.

What is claimed is:

1. In combination with a steam generator and a consumer interconnected for the flow of steam therebetween; a branch line for branching the flow of steam between said generator and consumer, an overflow valve in said branch line having a spindle therein for selectively opening and closing said valve to a flow of steam, a double-acting servo-piston connected to said spindle to drive said spindle, a cylinder slidably mounting said servo-piston therein, at least one conduit bridging said servo-piston, said conduit connecting at one end with a space within said cylinder to one side of said servo-piston and at another end with a space within said cylinder to an opposite side of said servo-piston, a valve in said conduit for interrupting the connection of said spaces on said sides of said servo-piston, and means connected to said latter valve for opening said latter valve in response to the steam pressure exceeding a predetermined safety pressure limiting value at the inlet of said overflow valve whereby said overflow valve is permitted to open pressure of said flow of steam.

2. The combination as set forth in claim 1 wherein said means comprises a pressure sensor connected into the flow of steam between said generator and consumer to measure the pressure of the steam for actuation of said latter valve.

3. The combination as set forth in claim 2 wherein said means further comprises a magnet coil between said pressure sensor and said latter valve.

4. The combination as set forth in claim 1 further comprising a plurality of said conduits bridging over said servo-piston, each conduit having a respective one of said latter valves therein and each latter valve being connected over a respective pressure sensor and magnetic coil to the flow of steam between said generator and said consumer.

5. The combination as set forth in claim 4 wherein at least one of said pressure sensors is adjustable in response to the load of said generator while one of said pressure sensors is not adjustable in response to the load of said generator.

6. The combination as set forth in claim 1 further comprising means for adjusting the pressure limiting value.

7. The combination as set forth in claim 1 further comprising means for biasing said piston to open said overflow valve.

8. In combination with a steam line between a steam generator and a consumer;
a branch line connected to said steam line and to an outlet,
an overflow valve in said branch line having a spindle therein,
a servo-piston having a piston for driving said spindle of said overflow valve to selectively open and close said overflow valve,
first means connected to said servo-piston for actuating said piston in response to the pressure in said steam line to open and close said overflow valve, and
second means connected to said servo-piston for actuating said piston to open said overflow valve in response to a limiting pressure in said steam line.

9. The combination as set forth in claim 8 wherein said second means includes at least one conduit branching over said servo-piston to communicate opposite sides of said piston, a valve in said conduit means for opening said valve in response to said limiting pressure occurring in said steam line and means for biasing said piston into an opened position with respect to said overflow valve.

10. The combination as set forth in claim 1 further comprising means for supplying fluid to said piston, a blocking element in communication with said latter valve, and means for actuating said blocking element in response to opening of said latter valve during a failure of the pressure of the fluid to interrupt the supply of fluid to said piston from said means for supplying fluid.

References Cited

UNITED STATES PATENTS

| | | | |
|---|---|---|---|
| 2,271,886 | 2/1942 | Jurzi | 60—73 |
| 2,825,306 | 3/1958 | Buri | 60—105 X |
| 3,069,859 | 12/1962 | Weehuizen | 60—73 |
| 3,100,967 | 8/1963 | Brunner | 60—105 X |
| 3,488,961 | 1/1970 | Gerber | 60—105 |

KENNETH W. SPRAGUE, Primary Examiner

U.S. Cl. X.R.

122—479 R

UNITED STATES PATENT OFFICE
CERTIFICATE OF CORRECTION

Patent No. 3,616,787   Dated November 2, 1971

Inventor(s) Ernst Vogeli

It is certified that error appears in the above-identified patent and that said Letters Patent are hereby corrected as shown below:

Column 2, line 29, "line" should be --live--

Signed and sealed this 26th day of September 1972.

(SEAL)
Attest:

EDWARD M. FLETCHER, JR.　　　　　　　ROBERT GOTTSCHALK
Attesting Officer　　　　　　　　　　　Commissioner of Patents

UNITED STATES PATENT OFFICE
CERTIFICATE OF CORRECTION

Patent No. 3,616,787     Dated November 2, 1971

Inventor(s) Ernst Vogeli

It is certified that error appears in the above-identified patent and that said Letters Patent are hereby corrected as shown below:

Column 3, line 59, "slide" should be --element 35--

Column 3, line 60, "element 35" should be --slide--

Signed and sealed this 1st day of May 1973.

(SEAL)
Attest:

EDWARD M. FLETCHER, JR.
Attesting Officer

ROBERT GOTTSCHALK
Commissioner of Patents